United States Patent
Xu

[19]

[11] Patent Number: 6,121,574

[45] Date of Patent: Sep. 19, 2000

[54] TWO-DIMENSIONAL BAR CODE LASER MARKING METHOD

[75] Inventor: Feng-Yu Xu, Chiba-ken, Japan

[73] Assignee: Miyachi Technos Corporation, Chiba-ken, Japan

[21] Appl. No.: 09/203,381

[22] Filed: Dec. 2, 1998

[30]     Foreign Application Priority Data

Dec. 3, 1997  [JP]  Japan .................................. 9-348624

[51] Int. Cl.[7] .................................................. B23K 26/00
[52] U.S. Cl. ................................ 219/121.69; 219/121.8; 235/462.09
[58] Field of Search ......................... 219/121.68, 121.69, 219/121.8, 121.74; 235/462.09, 494

[56]            References Cited

U.S. PATENT DOCUMENTS

| | | | |
|---|---|---|---|
| 4,156,124 | 5/1979 | Macken et al. ..................... | 219/121.68 |
| 4,675,498 | 6/1987 | Lemelson . | |
| 5,175,774 | 12/1992 | Traux et al. . | |
| 5,463,200 | 10/1995 | James et al. ....................... | 219/121.69 |
| 5,481,100 | 1/1996 | Terauchi ................................ | 235/494 |
| 5,546,214 | 8/1996 | Black et al. ....................... | 219/121.74 |
| 5,637,850 | 6/1997 | Honda . | |
| 5,907,144 | 5/1999 | Poon et al. . | |
| 5,932,119 | 8/1999 | Kaplan et al. ..................... | 219/121.68 |

*Primary Examiner*—Geoffrey S. Evans
*Attorney, Agent, or Firm*—Wenderoth, Lind & Ponack, L.L.P.

[57]             ABSTRACT

In marking execution mode, after initialization, a scanning control signal based on predetermined marking data and condition data is sent to a scanning head so that a beam spot of a YAG laser beam scans spirally on the interior of a predetermined first black cell in a two-dimensional bar code marking region on the surface of a workpiece W. After the completion of the spiral scanning on the interior of the first black cell, the beam spot skips over from the scanning end point to a scanning start point of a second black cell adjacent to that end point. Then, the interior of the second black cell is also scanned with the beam spot in a unit plotting pattern similar to the above. Afterward, the same spiral scanning as the above is iteratively made on a third and all subsequent black cells. Upon the completion of the spiral scanning on the last black cell, all the marking actions are complete.

4 Claims, 13 Drawing Sheets

| | | |
|---|---|---|
| Start No. | 0 | |
| File name | E00-20A | |
| Data No. | 1 | |
| CHAR layout | I.D CODE | |
| X—coordinate | 0.00 | |
| Y—coordinate | 0.00 | |
| Row | 2.00 | |
| Clumn | 2.00 | |
| ECC type | ECC-00 | |
| Format ID | FORMAT3 | |
| Image type | Normal | |
| DIAGNL angle | 0.0 | |
| Fill pitch | 0.06 | |
| Line WD CORR | 0.00 | |

Data  A B C D

Next | PREV | Move | | Delete | REDISP | | Close | | HV | Posi | Shut | Pump

TIMING CELLS

DATA REGIONS

BORDER CELLS

TWO-DIMENSIONAL BAR CODE LASER MARKING METHOD

BACKGROUND OF THE INVENTION

1. Field of the Invention

The present invention relates to a laser marking method for creating a matrix type two-dimensional bar code.

2. Description of the Related Arts

Recently there begin to appear signs of prevalence of two-dimensional bar codes having information in two-dimensional directions. The two-dimensional bar codes include a stack type bar code consisting of one-dimensional bar codes which have vertically been stacked to display information by its vertical and horizontal representations, and a matrix type bar code consisting of black and while cells which have been arranged in a mosaic manner (matrix form) in vertical and horizontal directions to display information.

Figure 14:
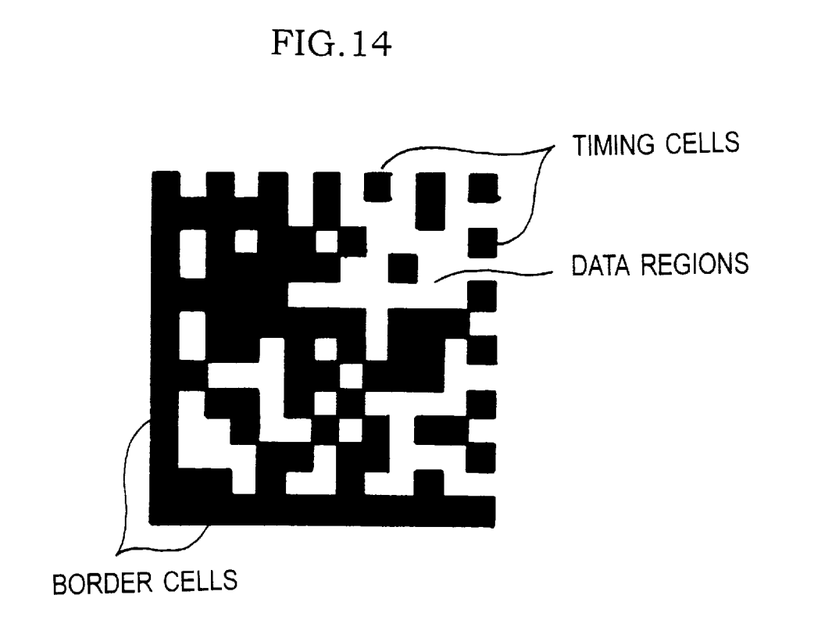
FIG. 14 is a diagram showing a display pattern of Data Code as an example of a matrix type two-dimensional bar code.

FIG. 14 illustrates Data Code which is a typical standard of the matrix type.

The Data Code comprises L-shaped guide cells or border cells consisting of black cells arranged continuously so as to form an L, timing cells consisting of white and black cells alternately arranged opposite the border cells, and a data area consisting of white and black cells arranged inside the border cells and the timing cells in an arbitrary pattern based on the display data.

In order to read the two-dimensional bar code of this type, the entire bar code is fetched as an image by a CCD camera and is interpreted using an image recognition technique. Through the image processing, in this case, the position and the direction of turn (angle) of the two-dimensional bar code are recognized on the basis of the border cells and the coordinates of each cell are determined relative to the timing cells. Then, the pattern of array of the white and black cells lying within the data area is rearranged into the original code.

Figure 15A:
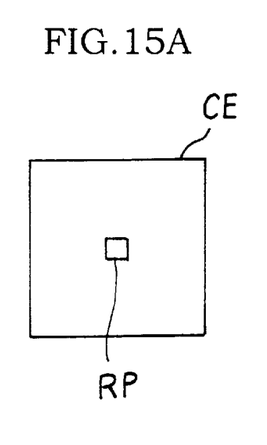
FIG. 15A to 15C are diagrams each showing a method of reading the matrix system two-dimensional bar code.
Figure 15B:
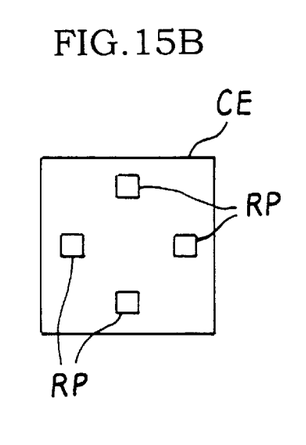
Figure 15C:
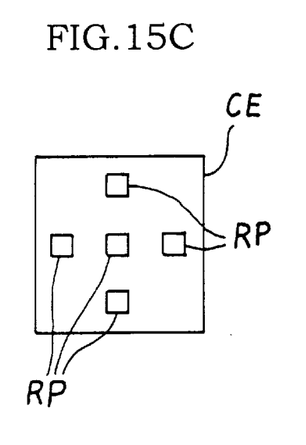

In order to recognize each cell CE in this image recognition, it is identified whether a predetermined point (representative point) RP within the cell CE is black or white as shown in FIGS. 15A to 15C. Then, on the basis of the result of identification, decision is made of whether it is a white cell or a black cell. Depending on the number of the representative points RP, there are for example a one-point method (FIG. 15A), a four-point method (FIG. 15B) and a five-point method (FIG. 15C).

On the other hand, various printing methods are feasible for creating two-dimensional bar codes. Among them, a laser marking method has an advantage in that two-dimensional bar codes can directly be printed on the surface of a workpiece, and hence is useful for the direct marking onto semiconductor wafers, IC packages, etc.

Figure 16:
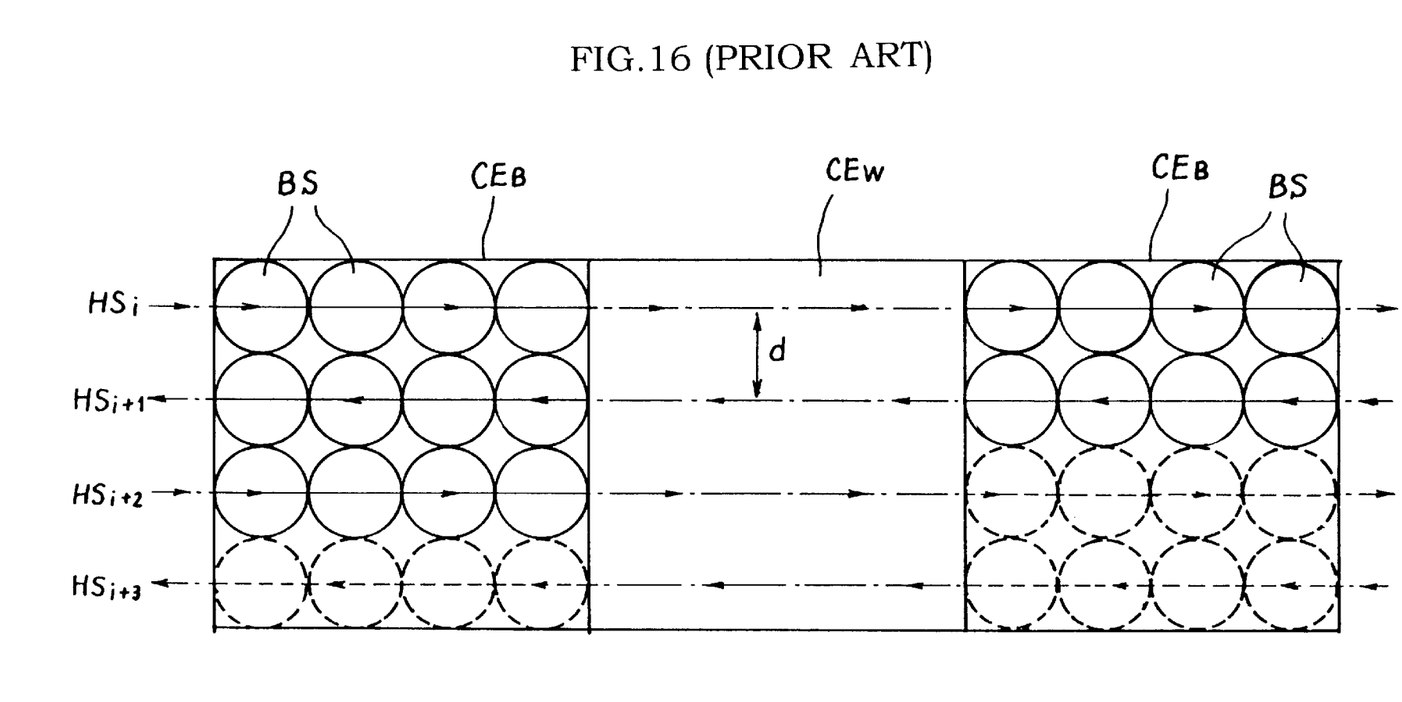
FIG. 16 is a diagram showing a trace of movement of a laser beam spot in a conventional laser marking method.

In a conventional typical laser marking method for the creation of the two-dimensional bar codes, as shown in FIG. 16, a beam spot BS of laser beam is traversed horizontally across the surface of the workpiece to obtain one scanning line HS, and then the horizontal scanning line HS is displaced vertically by a predetermined pitch d to iterate the scanning action predetermined number of times. Ordinarily, several lines are allocated to cells in a line.

Accordingly, each black cell $CE_B$ is a unit region in which several horizontal scanning lines HS are juxtaposed in the vertical direction. On the other hand, the white cell $CE_W$ is a unit region in which such horizontal scanning lines HS are absent (jumped over) without being plotted.

Incidentally, in case a single black cell is formed from a single laser beam spot having a larger diameter, the cell center may inconveniently be deeply recessed, making it difficult to recognize images.

In FIG. 16, to facilitate the illustration, the traces (scanning lines) of the laser beam spot are shown in an intermittent manner at a pitch equal to the spot diameter. Actually, however, the traces are commonly in the form of continuous straight lines.

The two-dimensional bar code as described above is supported by an error correction function so as to ensure a correct restoration in spite of 20 to 30% of lacks of the data area. However, this error correction function is feasible only by the entire bar codes, which does not mean that rough display contents (black/white) of individual cell is permitted. It must definitely be displayed whether the individual cell is a black cell or a white cell.

In the case of the above conventional laser marking method of this type, such a demand for the cell display quality could be met by increasing the density of the horizontal scanning lines HS.

However, as compared with the time (the time of portions indicated by solid lines or broken lines of FIG. 16) during which the beam spot BS scans within each black cell $CE_B$, each horizontal scanning line HS requires a longer time (the time of portions indicated by one-dotted chain lines) in order to move the beam spot BS from a terminal end (right-hand end) of each black cell $CE_B$, over the region of the white cell $CE_W$ by skipping, to a start end (left-hand end) of the adjacent black cell $CE_B$. In addition, such skipping action is repeatedly carried out over each white cell $CE_W$.

Figure 17:
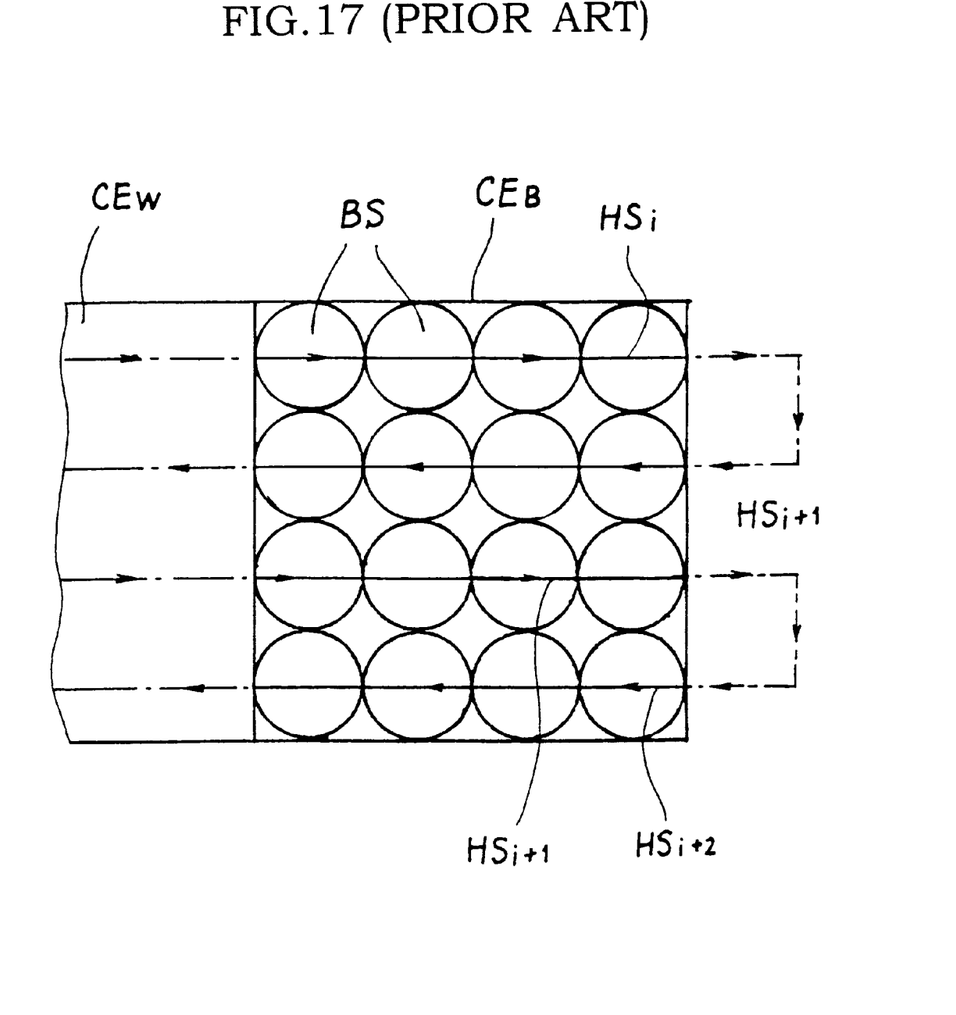
FIG. 17 is a diagram showing a trace of movement of the laser beam spot in a conventional laser marking method.

Furthermore, to prevent the marking quality from being degraded at the opposite ends of the bar code, as shown in FIG. 17, there is also performed a switching operation of the horizontal scanning lines on the outside of the ends, which results in an unnecessary waste of time.

SUMMARY OF THE INVENTION

The present invention was conceived in view of the above problems. It is therefore the object of the present invention to provide a laser marking method ensuring high-quality and effective marking of two-dimensional bar codes.

According to a first aspect of the present invention, in order to achieve the above object, there is provided a two-dimensional bar code laser marking method in which a laser beam scans on a surface of a workpiece for irradiation so as to mark the surface with a two-dimensional bar code having a matrix array of first cells as unit irradiation regions and second cells as unit non-irradiation regions arranged in a desired pattern, the method comprising the steps of spirally scanning with a beam spot of the laser beam on the interior of each of the first cells to form a unit irradiation region; and making the spiral scanning on the first cells one by one in a predetermined order.

According to a second aspect of the present invention, in connection with the first aspect, there is provided a laser marking method wherein between two of the first cells adjacent to each other in the scanning order, the beam spot of the laser beam skips over from a predetermined scanning end point of former one of the adjacent cells to a predetermined scanning start point of latter one of the adjacent cells.

According to a third aspect of the present invention, in connection with the first or second aspect, there is provided a laser marking method wherein the scanning is made on the first cells in the order of array along a route starting from one of four corners of the two-dimensional bar code and proceeding to all cells spirally from the outer side toward the inner side.

As used herein, "spiral" means that the route advances continuously or intermittently, while turning in an arbitrary form, from the outer periphery toward its center, or reversely, from its center toward the outer periphery. Therefore, the spiral form includes not merely circular spiral form but also rectangular or other polygonal forms. It further includes a combined spiral form of the circular spiral form and the polygonal spiral form.

As used herein, "unit irradiation region" and "unit non-irradiation region" refer to two different unit regions (cells) optically readable depending on the presence or absence of irradiation of the laser beam, but need not necessarily be black or white.

DESCRIPTION OF THE PREFERRED EMBODIMENTS

The present invention will now be described with reference to FIGS. 1 to 13 which illustrate preferred embodiments thereof.

Figure 1:
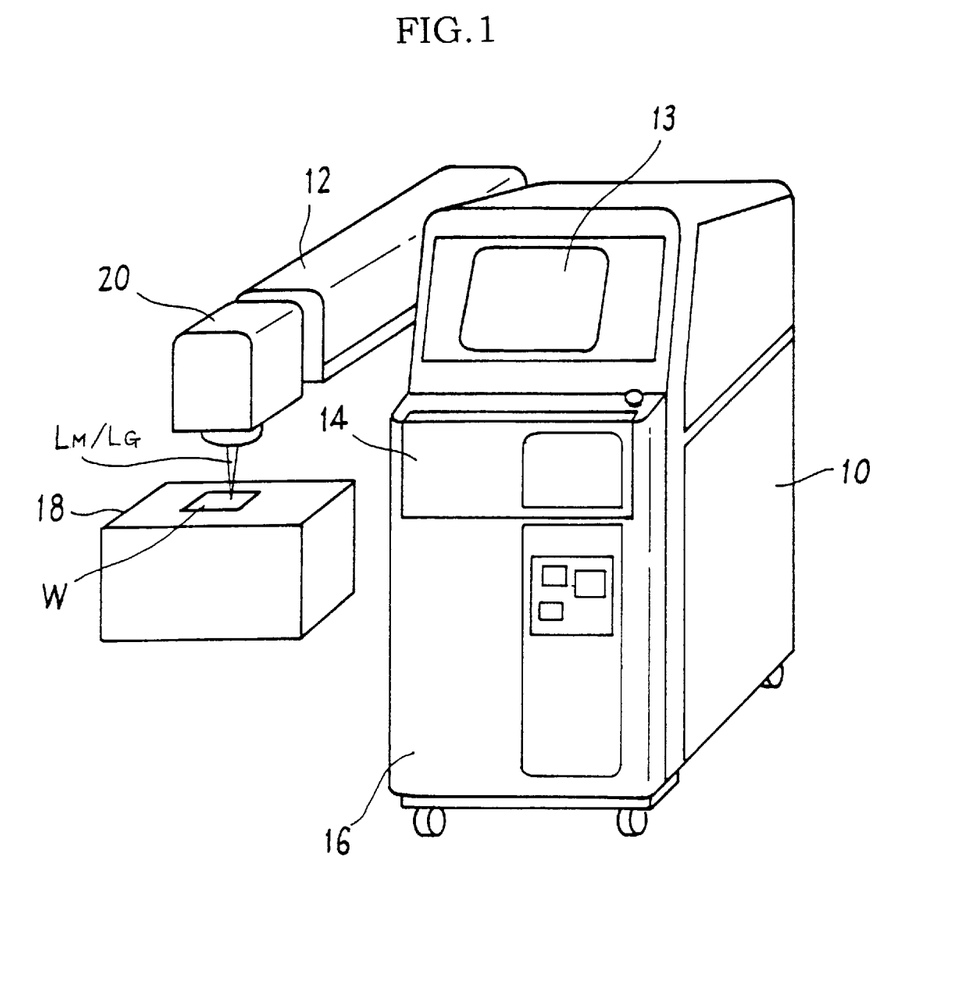
FIG. 1 is a perspective view showing an external appearance of a scanning type YAG laser marking apparatus for carrying out a laser marking in accordance with an embodiment of the present invention.

FIG. 1 is an external view of a scanning type YAG (yttrium aluminum garnet) laser marking apparatus for use in a laser marking method in accordance with an embodiment of the present invention. The YAG laser marking apparatus comprises a control power supply unit 10, a laser oscillation unit 12 and a scanning head 20.

The control power supply unit 10 comprises an upper chamber provided with a display 13 constituting a display unit, an intermediate chamber (behind a front door 14) provided with a keyboard and a control board, and a lower chamber (behind a front door 16) having a laserpower supply circuit, a laser cooling device, etc., arranged therein. A scanning control signal is generated by a control unit within the intermediate chamber and is transmitted via a predetermined signal line (not shown) to the scanning head 20. The scanning head 20 is fitted to the laser oscillation unit 12 at its laser emitting port, with a workbench 18 being arranged just below the head 20. A workpiece W is disposed on the workbench 18 and is subjected to marking.

Figure 2:
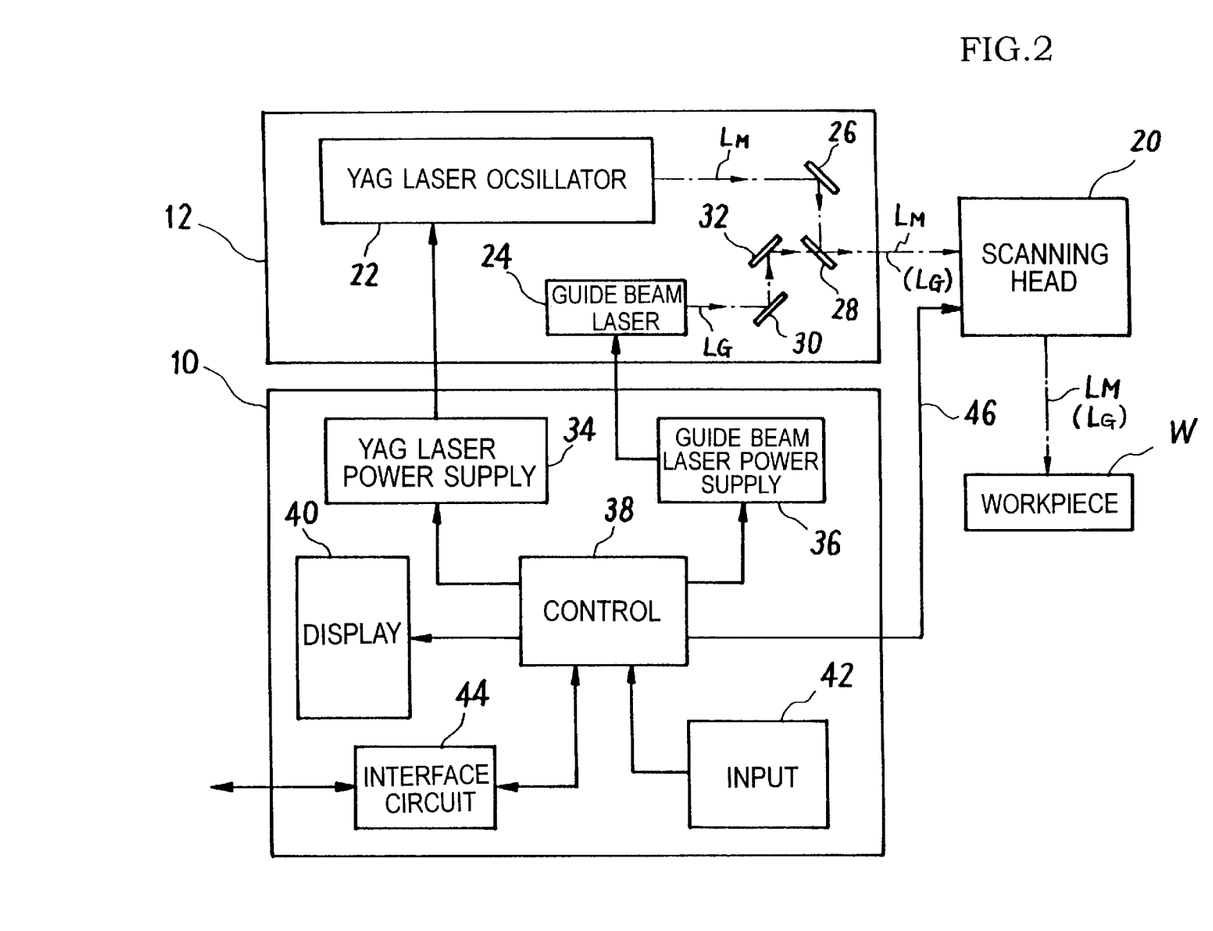
FIG. 2 is a block diagram showing a configuration of major parts of a power supply unit and a laser oscillation unit in the laser marking apparatus of the embodiment.

FIG. 2 illustrates a configuration of major parts of the control power supply unit 10 and of the laser oscillation unit 12.

The laser oscillation unit 12 comprises a YAG laser oscillator 22 for oscillating a YAG laser beam $L_M$ for marking, and a guide beam laser 24 in the form of a He—Ne laser or a semiconductor laser for generating a visible light having a high level of directivity, e.g., a red guide beam $L_G$. The YAG laser beam $L_M$ oscillated from the YAG laser oscillator 22 has an optical path which is first bent at right angle by a mirror 26 and then bent at right angle by a mirror 28 and straightforwardly advances toward the scanning head 20. The guide beam $L_G$ generated by the guide beam laser 24 has an optical path which is first bent at right angle by a mirror 30 and then bent at right angle by a mirror 32 and, after passing through the mirror 28 from its back, straightforwardly advances toward the scanning head 20.

The control power supply unit 10 comprises an YAG laser power supply 34, a guide beam laser power supply 36, the control unit and display unit designated at 38 and 40, respectively, an input unit 42, and an interface circuit 44. The YAG laser power supply 34 supplies an electric power to laser excitation means (e.g., an excitation lamp) provided in the YAG laser oscillator 22 under the control of the control unit 38. The guide beam laser power supply 36 supplies the guide beam laser 24 with an electric power under the control of the control unit 38.

The display unit 40 provides a screen on the display 13 in accordance with image data and display control from the control unit 38. The input unit 42 includes input devices such as the keyboard, a mouse and image scanner. The interface circuit 44 is used to interchange data, control signals, etc., with an external device (not shown).

The control unit 38 is in the form of a microcomputer which executes desired data processing in accordance with a predetermined software stored in its internal memory to provide a control of the units in the apparatus. In particular, the control unit 38 executes desired processing in a setting input mode or a marking execution mode which will be described later. In the marking execution mode, the control unit 38 feeds a scanning control signal for the control of a scanning action of the scanning head 20, via a signal line 46, to a scanning drive circuit in the head 20. The YAG laser oscillator 22 has a built-in Q switch for the acquisition of a pulse laser beam having an extremely high peak output (peak value), which Q switch is also controlled via a control line not shown by the control unit 38.

Figure 3:
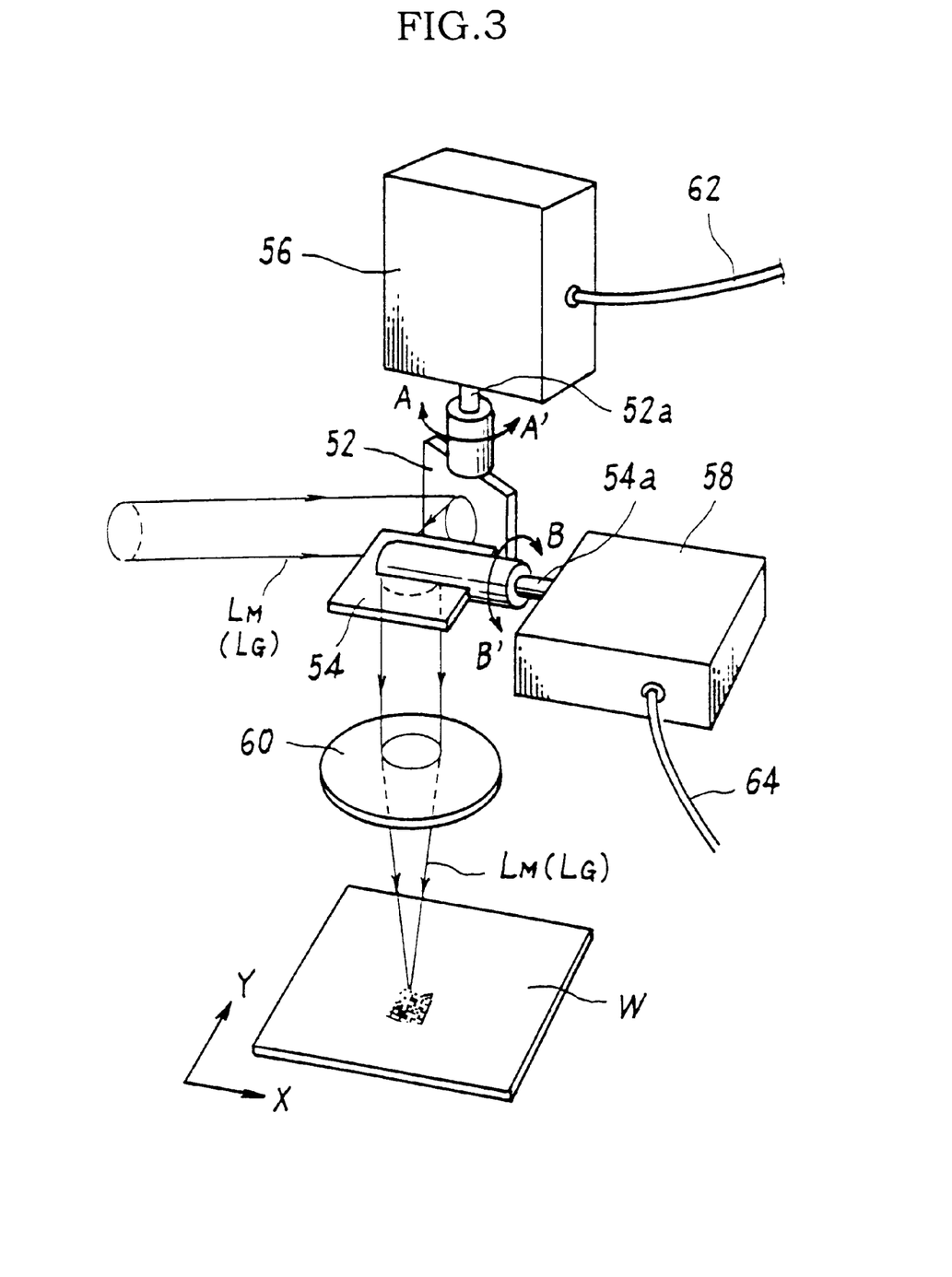
FIG. 3 is a perspective view showing an example of configuration of a scanning mechanism of a scanning head in the laser marking apparatus of the embodiment.

FIG. 3 illustrates by way of example a configuration of a scanning mechanism in the scanning head 20. The scanning mechanism includes an X-axis scanning mirror 52 and a Y-axis scanning mirror 54 fitted to rotating shafts 52a and 54a, respectively, which are perpendicular to each other, and includes an X-axis galvanometer 56 and a Y-axis galvanometer 58 which rotationally oscillate (turn) the mirrors 52 and 54, respectively.

After having entered the scanning head 20, the laser light $L_M$ and the guide light $L_G$ from the laser oscillation unit 12 first impinge on the X-axis scanning mirror 52, at which the lights are totally reflected to impinge on the Y-axis scanning mirror 54, at which the lights are totally reflected to pass through an f θ lens 60 to be thereafter condensed on the surface of the workpiece W for irradiation. The position of a beam spot BS on the marking surface depends in the X-direction on the angle of deflection of the X-axis scanning mirror 52 and depends in the Y-direction on the angle of deflection of the Y-axis scanning mirror 54.

The X-axis scanning mirror 52 is allowed to rotationally oscillate (turn) in the direction indicated by arrows A and A' by the drive of the X-axis galvanometer 56. On the other hand, the Y-axis scanning mirror 54 is allowed to rotationally oscillate (turn) in the direction indicated by arrows B and B' by the drive of the Y-axis galvanometer 58.

The X-axis galvanometer 56 incorporates a moving armature (rotor) coupled to the X-axis scanning mirror 52, a control spring connected to the movable armature, and a drive coil secured to a stator. An X-axis galvanometer drive circuit (not shown) feeds a drive current in accordance with an X-direction scanning control signal, via an electric cable 62, to the drive coil in the X-axis galvanometer 56 so that the moving armature (rotor) turns through an angle specified by the X-direction scanning control signal, together with the X-axis scanning mirror 52, against the control spring.

The Y-axis galvanometer 58 has also the same configuration. That is, a Y-axis galvanometer drive circuit (not shown) feeds a drive current in accordance with a Y-direction scanning control signal, via an electric cable 64, to a drive coil in the Y-axis galvanometer 58 so that a moving armature (rotor) in the Y-axis galvanometer 58 turns through an angle specified by the Y-direction scanning control signal, together with the Y-axis scanning mirror 54.

Thus, in synchronism with the YAG laser beam $L_M$ and guide beam $L_G$ from the laser oscillation unit 12 which enter the scanning head 20 at predetermined timings, the two galvanometers 56 and 58 turn the X-axis scanning mirror 52 and Y-axis scanning mirror 54 through their respective predetermined angles in response to the X-direction and Y-direction scanning control signals so that the beam spot BS of the laser beam $L_M$ and guide beam $L_G$ scans over the marking surface of the workpiece W.

Figure 4:
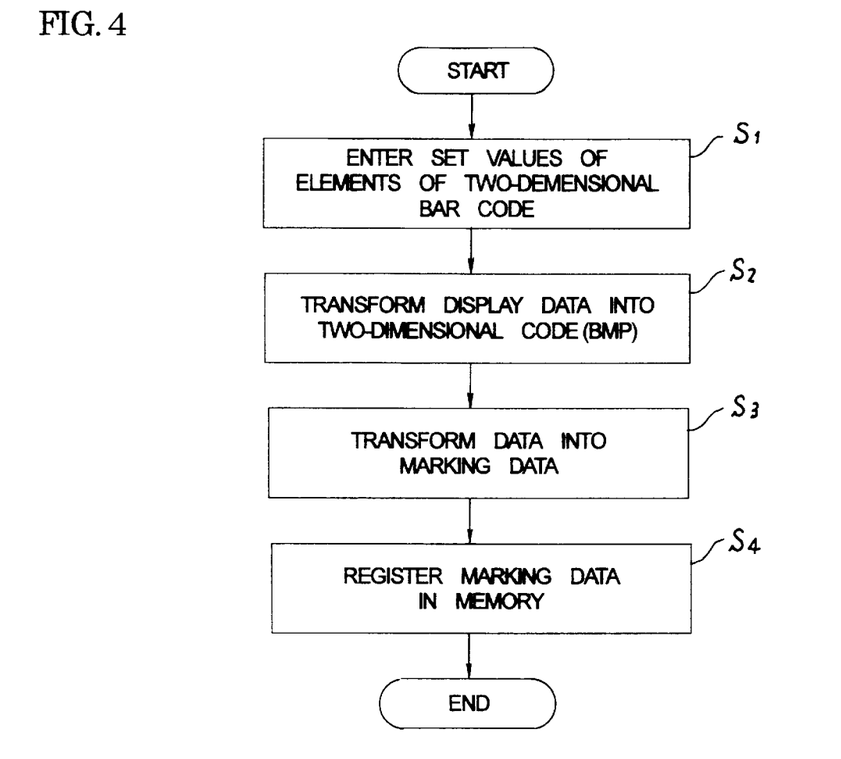
FIG. 4 is a flowchart showing processing effected by a control module for a setting input in the embodiment.

Description will then be made of a setting input for the creation of a two-dimensional bar code in this embodiment. FIG. 4 is a flowchart which illustrates processing effected by the control unit 38 in the setting input mode.

Figure 5:
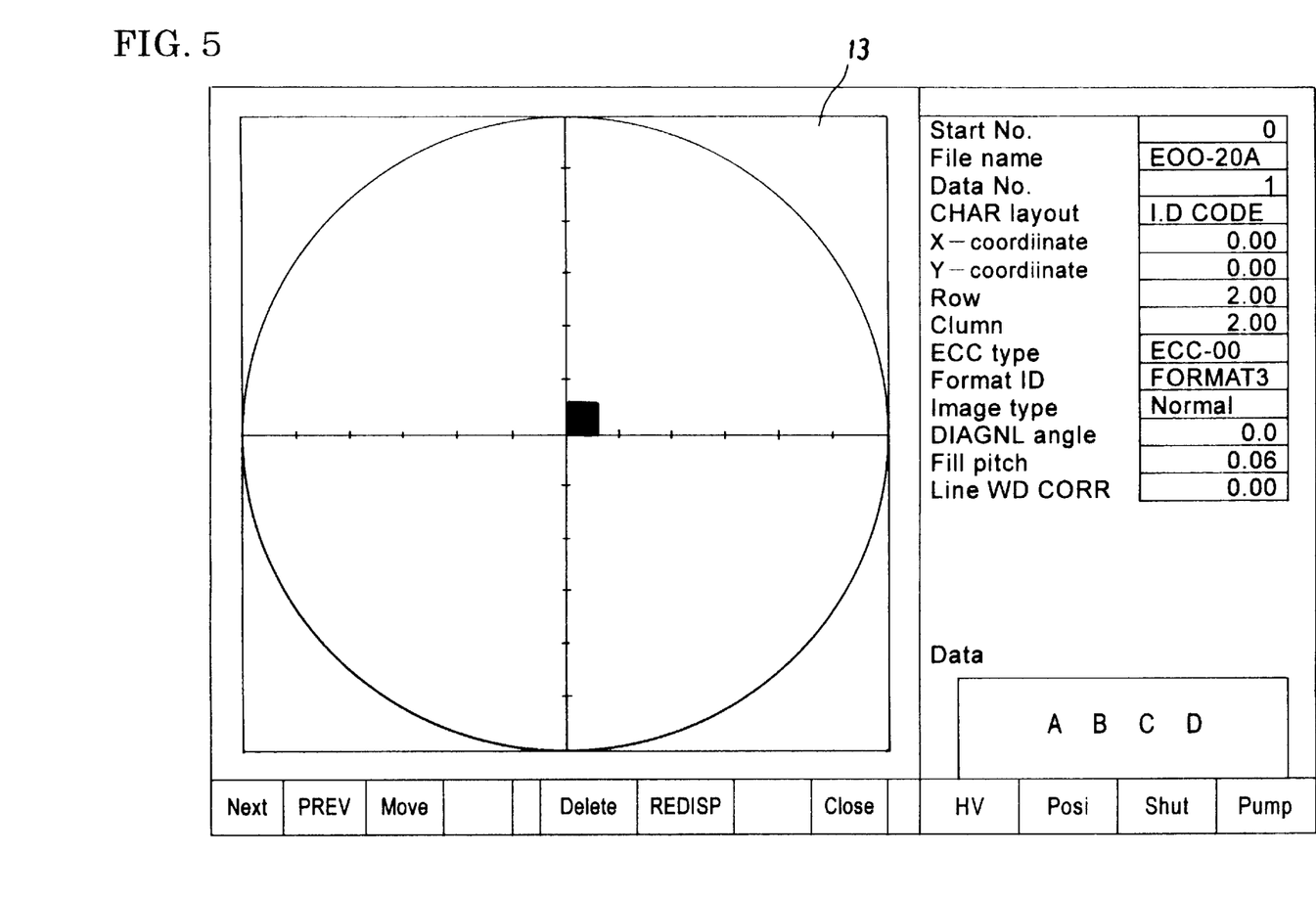
FIG. 5 is a schematic front elevational view showing a setting input screen in the embodiment.

This setting input mode provides a setting input screen as shown in FIG. 5 on the display 13 of the display unit 40 so that there are acquired set values of elements of a two-dimensional bar code input through the mouse or keyboard of the input unit 42 (step S1).

In the case of Data Code, the elements of the two-dimensional bar code include display data as well as a bar code size (length of one side of a square), an error correction level (ECC type) and an available character type format (FORMAT ID).

In the example of FIG. 5, a character string ABCD is entered as the display data, with the bar code size of 2 mm specified. ECC-0 (extension rate 0%) is selected as the error correction level, with a selection of FORMAT 3 (alphabets and space, numerals, signs, etc.) as the format.

Figure 6:
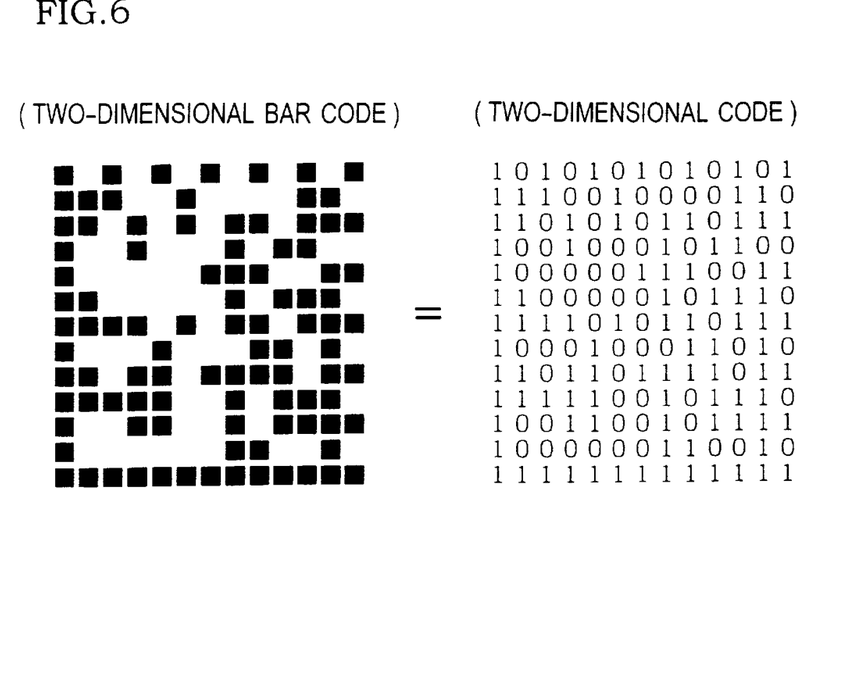
FIG. 6 is a diagram showing a bitmapped two-dimensional code in the embodiment.

Then, the control unit 38 encodes the entered display data (the character string ABCD in the example of FIG. 5) into a two-dimensional code to create a data file in a bitmap (BMP) form as shown in FIG. 6 (step S2). In this bitmapped two-dimensional code, "1" and "0" correspond respectively to an irradiated cell, e.g., a black cell (first cell) and a non-irradiated cell or a white cell (second cell) in an objective two-dimensional bar code.

Then, the control unit 38 converts the bit mapped two-dimensional code into marking data for laser scanning (step S3). The marking data include position data indicative of positions of cells, in particular, black cells $CE_B$ in an objective two-dimensional bar code, and unit plotting data for spirally scanning the interior of each black cell $CE_B$ with the laser beam spot in accordance with a predetermined plotting pattern.

Figure 7:
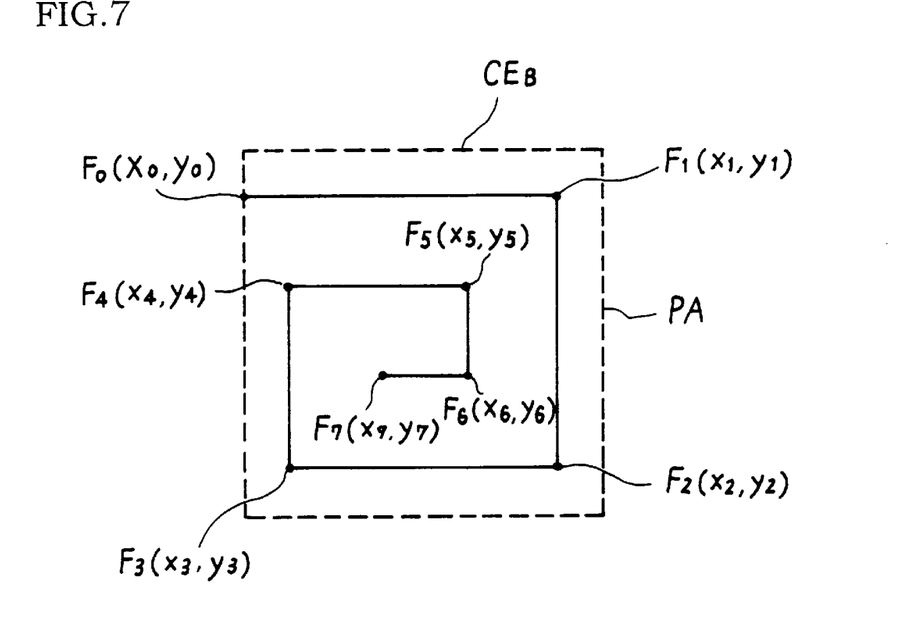
FIG. 7 is a diagram showing an example of a plotting pattern defined by unit plotting data in the embodiment.

FIG. 7 illustrates an example of a unit plotting pattern defined by the unit plotting data. As shown, there is a previously registered basic pattern similar to a rectangular spiral plotting pattern PA so that the basic pattern is coordinate transformed so as to conform to the cell size corresponding to the size (set value) of the two-dimensional bar code to thereby obtain unit plotting data indicative of the unit plotting pattern PA.

In the case of the example of FIG. 7, the unit plotting pattern PA is defined by coordinates of a start point F0, bend points F1 to F6 and an end point F7 or by vectors of line segments each joining the points.

The control unit 38 stores and registers the thus created marking data into a predetermined storage area (step S4).

In addition to the setting input of the two-dimensional bar code elements as described above, the setting input mode allows on another screen (not shown) a setting input of conditions for marking actions, e. g., of various condition data such as Q switch frequency, a scanning rate, a lamp current and a maximum beam amplitude.

Description will then be made of a marking action for the creation of the two-dimensional bar code in this embodiment.

Figure 8:
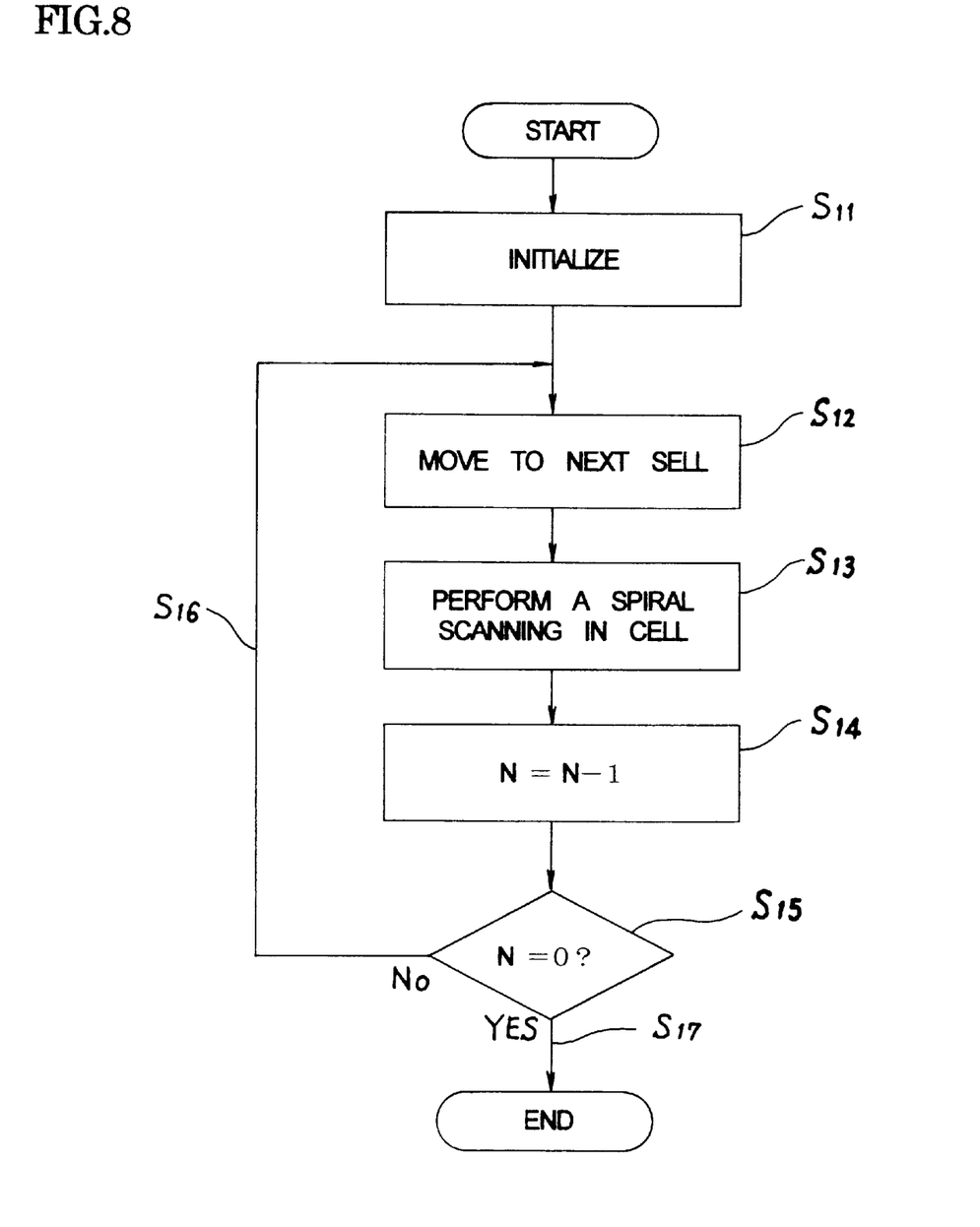
FIG. 8 is a flowchart showing processing effected by the control module for a marking action in the embodiment.

FIG. 8 illustrates processing of the control unit 38 effected in the marking execution mode of this embodiment.

When entering the marking execution mode, the control unit 38 first performs a desired initialization (step S11). In this initialization, above all, a specified start number is identified so that marking data and condition data corresponding to the start number are retrieved from the memory.

The control unit 38 actuates the YAG laser oscillator 22 and the guide beam laser 24 by way of the YAG laser power supply 34 and the guide beam laser power supply 36, allowing the YAG laser beam $L_M$ and the guide beam $L_G$ to be emitted.

Then, a scanning control signal in accordance with the retrieved marking data and condition data is imparted to the scanning head 20 so that the beam spot BS of the YAG laser beam $L_M$ and the guide beam $L_G$ scans spirally in the unit plotting pattern PA within a predetermined first black cell $CE_B$ in the two-dimensional bar code marking region on the surface of the workpiece W (steps S12 and S13).

This scanning action allows a minute region of the surface of the workpiece W on which the beam spot BS of the YAG laser beam $L_M$ has impinged to be instantaneously evaporated or changed in color by the laser energy so that a trace of the beam spot BS forms a marking of a spiral pattern similar to the unit plotting pattern PA.

After the completion of the spiral scanning within the first black cell $CE_B$ as described above, the beam spot BS skips over from that scanning end point (F7) to a scanning start point (F0) of a second black cell $CE_B$ adjacent to the above end point (F7) (Steps S14, S15, S16, S12). Then, the interior of this second black cell $CE_B$ is also scanned spirally with the beam spot BS in the unit plotting pattern PA similar to the above.

Afterward, all of the third and subsequent black cells $CE_B$ are also iteratively subjected to the same spiral scanning as the above, and all the marking actions are complete at the time when the spiral scanning within the last black cell $CE_B$ has been completed (step S12, S13, S14, S15, S17).

Figure 9:
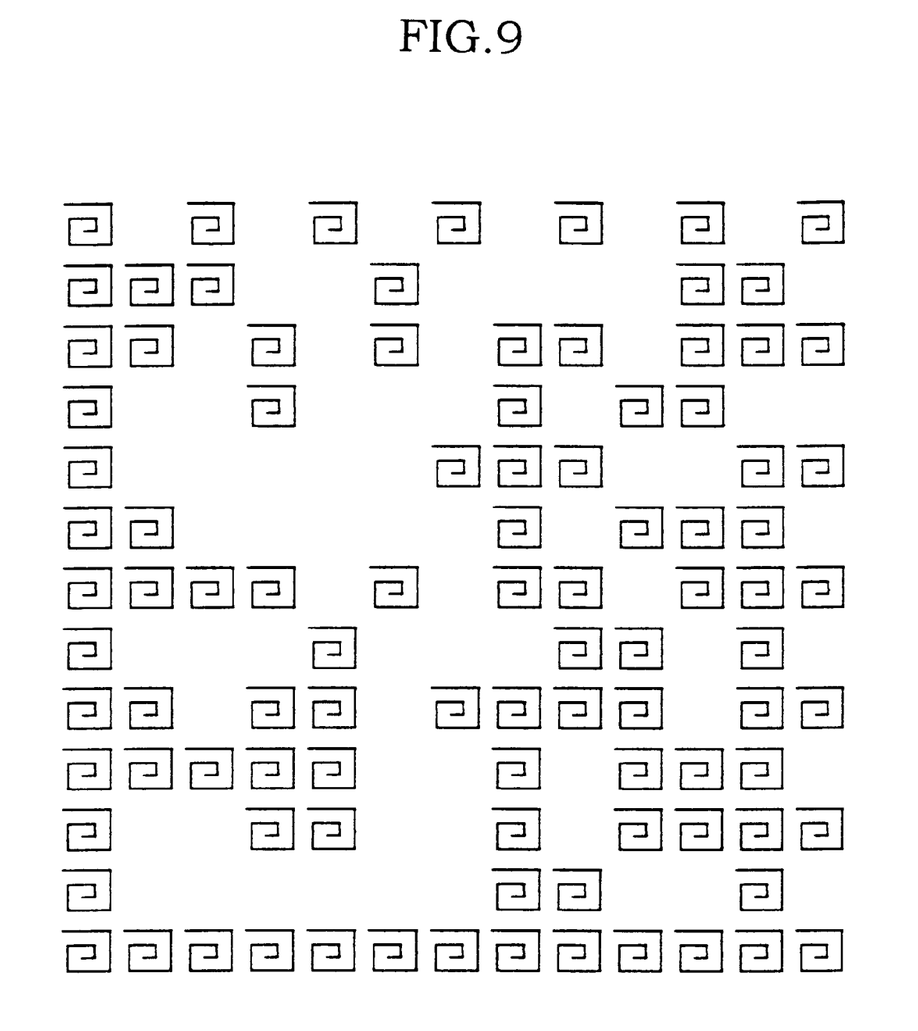
FIG. 9 is a diagram showing an example of an overall pattern of a two-dimensional bar code obtained by the marking action in the embodiment.

FIG. 9 illustrates by way of example an overall pattern of the two-dimensional bar code obtained by the marking actions in accordance with this embodiment. As shown, a spiral marking is formed in the same plotting pattern within all of the black cells $CE_B$. No marking is formed within the white cells $CE_W$, allowing the surface of the workpiece W to remain exposed as it was.

In the laser marking actions of this embodiment, as set forth hereinabove, all of the black cells $CE_B$ of the objective two-dimensional bar code are subjected sequentially one by one to the spiral scanning. This scanning order may be random, but preferably it is determined on the basis of a certain rule so as to minimize the time taken to complete all the marking actions.

In the case of the Data Code shown in the diagram, there are inevitably included both border cells having an L-shaped array of contiguous black cells and timing cells having an inverted L-shaped array opposed to the border cells and consisting of alternate black cells and white cells.

Figure 10:
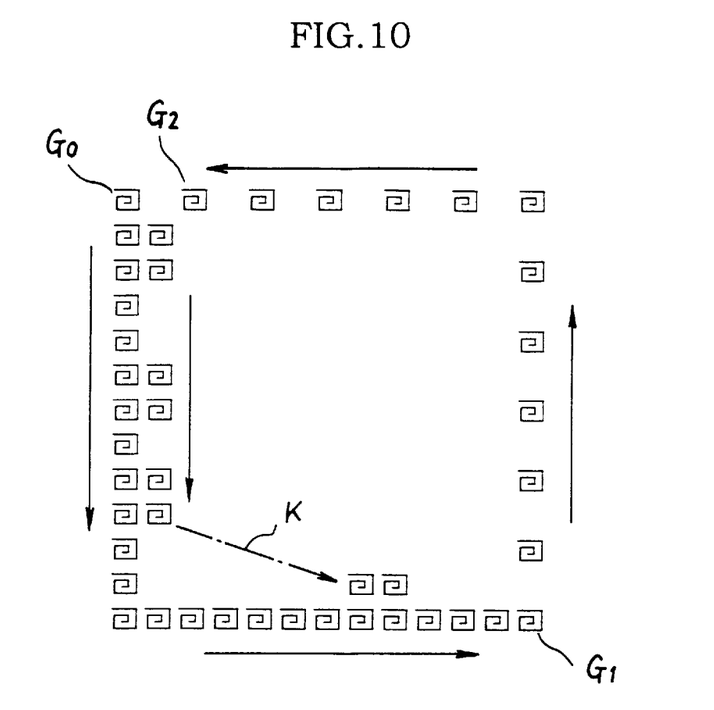
FIG. 10 is a diagram showing the order of scanning on a black cell in the embodiment.
Figure 11:
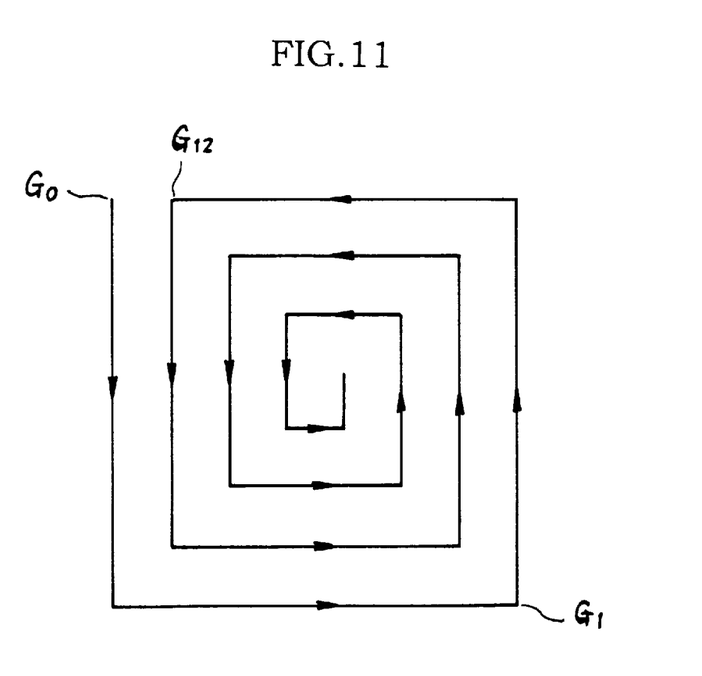
FIG. 11 is a diagram showing a route determining the order of scanning on the black cell in the embodiment.

According to this embodiment, the order of scanning on the black cells of the Data Code (two-dimensional bar code) is determined on the basis of the sequence of array along the advancing direction as shown in FIGS. 10 and 11.

More specifically, a black cell $CE_B$ positioned at one end of the border cells is defined as a scanning start point $G_0$ in the entire bar code. Then, the scanning advances from this start point $G_0$ along the L-shaped border cells to a terminal end $G_1$ of the border cells, at which the scanning is transferred to the timing cells. Then, the scanning advances along the inverted L-shaped timing cells to a terminal end $G_2$, at which the scanning is transferred to immediately inner cell array of the border cells. Afterward, the scanning advances in its extended direction toward the center in a spiral manner to establish a route which unitarily determines the order of scanning on the black cells.

According to the spiral scanning order, it is possible as shown in FIG. 10 to skip over diagonally by the shortest route as indicated by a one-dotted chain line K at the region where the while cells $CE_W$ contiguously gather in the vicinity of a corner of the bar code. This ensures an effective marking operation in an even shorter period of time.

It is to be appreciated that the scanning order may be determined along a route allowing a spiral advancement from the center toward the outer periphery, which is reverse to the route allowing the spiral advancement from the outer periphery toward the center as described above.

Figure 12:
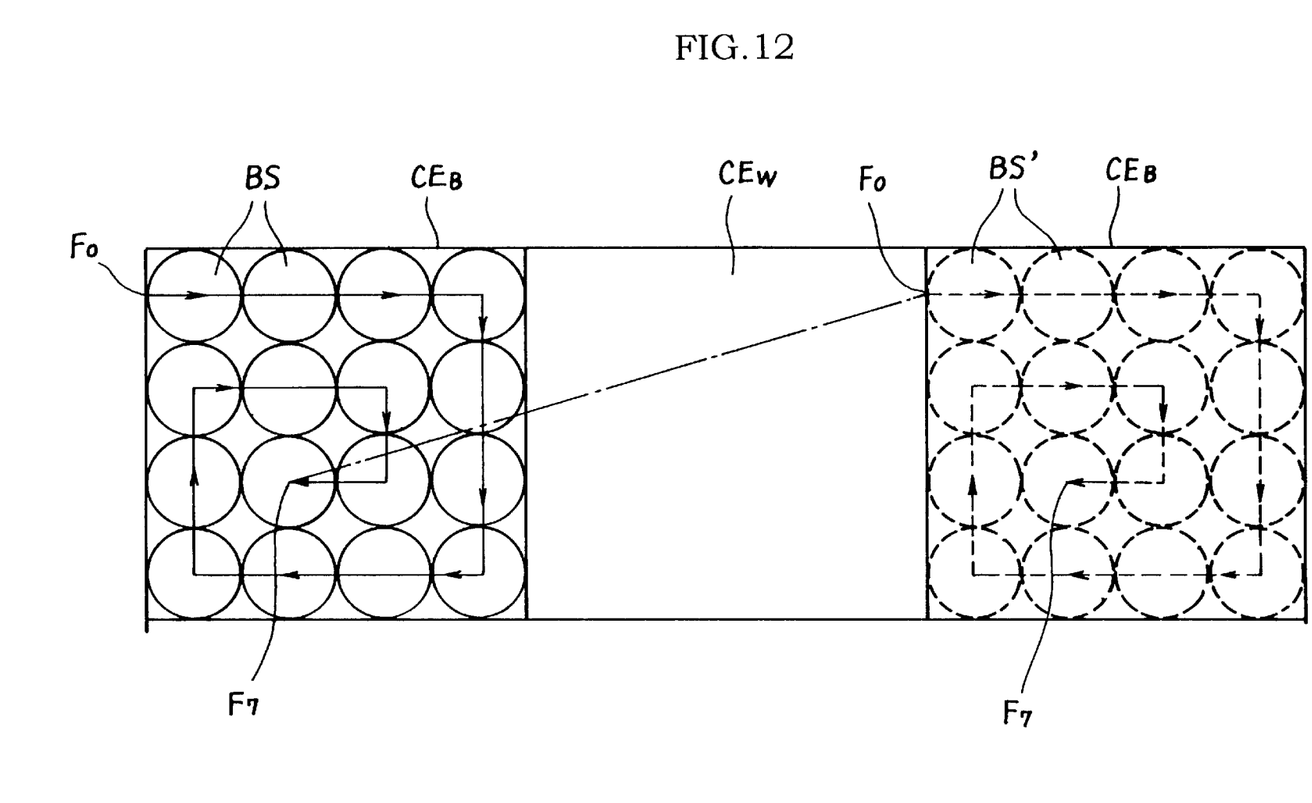
FIG. 12 is a diagram schematically showing a trace of movement of a laser beam spot in the embodiment.

FIG. 12 illustrates a local trace of movement of the laser beam spot BS. In this embodiment, the spiral scanning is made on the interior of each black cell $CE_B$ in accordance with the plotting pattern PA as shown in FIG. 7 using the laser beam spot BS. As a result of this, a single continuous scanning operation is capable of forming substantially a square unit black region within the black cell $CE_B$.

Furthermore, in this embodiment, after the completion of the scanning operation within one black cell $CE_B$, the laser beam spot BS skips over from that scanning terminal end to a scanning start point of the next black cell $CE_B$. In the event that a single or a plurality of white cells $CE_W$ lie between two black cells $CE_B$, the number of times of skipping of the laser beam spot BS over the region of those white cells $CE_W$ is only one. This enables the time taken for the skipping to be remarkably reduced as compared with the conventional laser marking method (see FIG. 16) of this type, which in turn allows a remarkable reduction of the total marking time required for the two-dimensional bar code.

It is also to be noted in FIG. 12 that to facilitate the illustration, the trace (scanning line) of the laser beam spot BS is intermittently drawn at a pitch equal to the spot diameter but that in fact it is commonly represented by a continuous straight line.

However, by employing a pulse laser beam having a longer cycle as the laser beam $L_M$ for marking, it is also possible to use a scanning line as indicated by a broken line.

It will be appreciated that the rectangular spiral unit plotting pattern PA in the above embodiment is merely exemplary and that other various spiral plotting patterns are also feasible.

Figure 13:
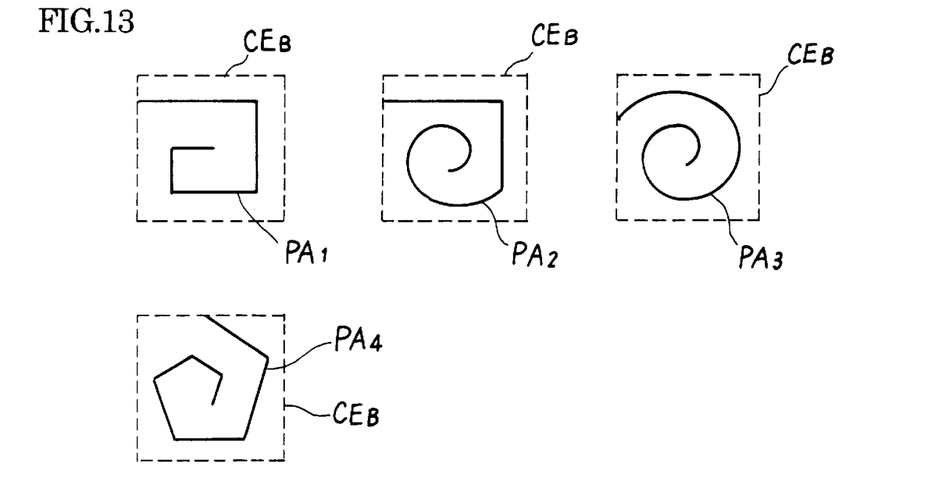
FIG. 13 is a diagram showing some variants of a unit plotting pattern in the embodiment.

FIG. 13 illustrates some variants of the unit plotting pattern. A pattern PA1 is a rectangular spiral pattern which is similar to the above embodiment but has a less number of spirals. On the contrary, it is also possible to increase the number of spirals. A pattern PA2 consists of a former half having the rectangular spiral pattern and a latter half having a circular spiral pattern. In this manner, it is also possible to arbitrarily combine different spiral forms. Furthermore, a pattern PA3 is a circular spiral pattern and a pattern PA4 is a pentagonal spiral pattern.

In the above embodiment, a spiral scanning was made on the interior of each black cell $CE_B$ with the laser beam spot BS in the direction from the outside toward the inside (centralportion). Contrary to this, however, it is also possible to make a spiral scanning in the direction from the inside (central portion) toward the outside.

The above embodiment was related to the laser marking for creating two-dimensional bar codes of Data Code. However, the present invention is applicable also to the laser marking of two-dimensional bar codes of the other matrix systems such as QR codes, VERI codes and CP codes.

According to the laser marking method of the present invention, as described hereinabove, a laser beam spot scans spirally within one of first cells which are to result in unit black regions, to form a unit black region, and a spiral scanning is made one by one on remainders of the first cells in a predetermined order, thereby making it possible to create a high-quality two-dimensional bar code with an effective marking action.

What is claimed is:

1. A two-dimensional bar code laser marking method in which a laser beam scans on a surface of a workpiece for irradiation so as to mark the surface with a two-dimensional bar code having a matrix array of first cells as unit irradiation regions and second cells as unit non-irradiation regions arranged in a desired pattern, said method comprising the steps of:

spirally scanning with a beam spot of said laser beam on the interior of each of said first cells to form a unit irradiation region; and making said spiral scanning on said first cells one by one in a predetermined order.

2. A laser marking method according to claim 1, wherein between two of said first cells adjacent to each other in the scanning order, said beam spot of said laser beam skips over from a predetermined scanning end point of former one of said adjacent cells to a predetermined scanning start point of latter one of said adjacent cells.

3. A laser marking method according to claim 1, wherein said scanning is made on said first cells in the order of array along a route starting from one of four corners of said two-dimensional bar code and proceeding to all cells spirally from the outer side toward the inner side.

4. A laser marking method according to claim 2, wherein said scanning is made on said first cells in the order of array along a route starting from one of four corners of said two-dimensional bar code and proceeding to all cells spirally from the outer side toward the inner side.

* * * * *